United States Patent [19]
Donoghue

[11] Patent Number: 4,971,226
[45] Date of Patent: Nov. 20, 1990

[54] ONE-PIECE MEASURING AND DISPENSING APPARATUS

[76] Inventor: Robert J. Donoghue, 4 Burnwood Dr., Bloomfield, Conn. 06002

[21] Appl. No.: 446,372

[22] Filed: Dec. 5, 1989

[51] Int. Cl.⁵ .......................... B65D 37/00; B67D 5/06
[52] U.S. Cl. .................................... 222/207; 222/205; 222/211
[58] Field of Search ............... 222/205, 207, 211, 206, 222/215, 212, 424.5, 543, 563

[56] References Cited

U.S. PATENT DOCUMENTS

| | | | |
|---|---|---|---|
| 2,599,446 | 6/1952 | Greene | 222/205 |
| 2,714,975 | 8/1955 | Greene | 222/205 |
| 3,581,953 | 6/1971 | Donoghue | 222/207 |
| 3,628,700 | 12/1971 | Donoghue | 222/207 |
| 4,077,547 | 3/1978 | Donoghue | 222/207 |
| 4,143,794 | 3/1979 | Stratford et al. | 222/207 X |
| 4,143,797 | 3/1979 | Reed | 222/207 |
| 4,157,768 | 6/1979 | Britt | 222/205 X |
| 4,474,312 | 10/1984 | Donoghue | 222/207 X |
| 4,747,521 | 5/1988 | Saffron | 222/205 |
| 4,830,226 | 5/1989 | Kong | 222/205 |

FOREIGN PATENT DOCUMENTS

| | | | |
|---|---|---|---|
| 0335505 | 10/1989 | European Pat. Off. | 222/207 |
| 2572056 | 4/1986 | France | 222/211 |
| 1535335 | 12/1978 | United Kingdom | 222/211 |
| 2067517 | 7/1981 | United Kingdom | 222/207 |
| 2133774 | 8/1984 | United Kingdom | 222/207 |
| 2146973 | 5/1985 | United Kingdom | 222/207 |

Primary Examiner—Kevin P. Shaver
Attorney, Agent, or Firm—A. W. Breiner

[57] ABSTRACT

A measuring and dispensing apparatus molded in one piece for placement in a neck of a flexible wall container is provided. The apparatus has side walls with an opening, a base wall, an open top and an upstanding central member which contains a central bore and side or lateral discharge ports for directing the flow of liquid at an angle offset from the axis of the central upstanding member.

7 Claims, 2 Drawing Sheets

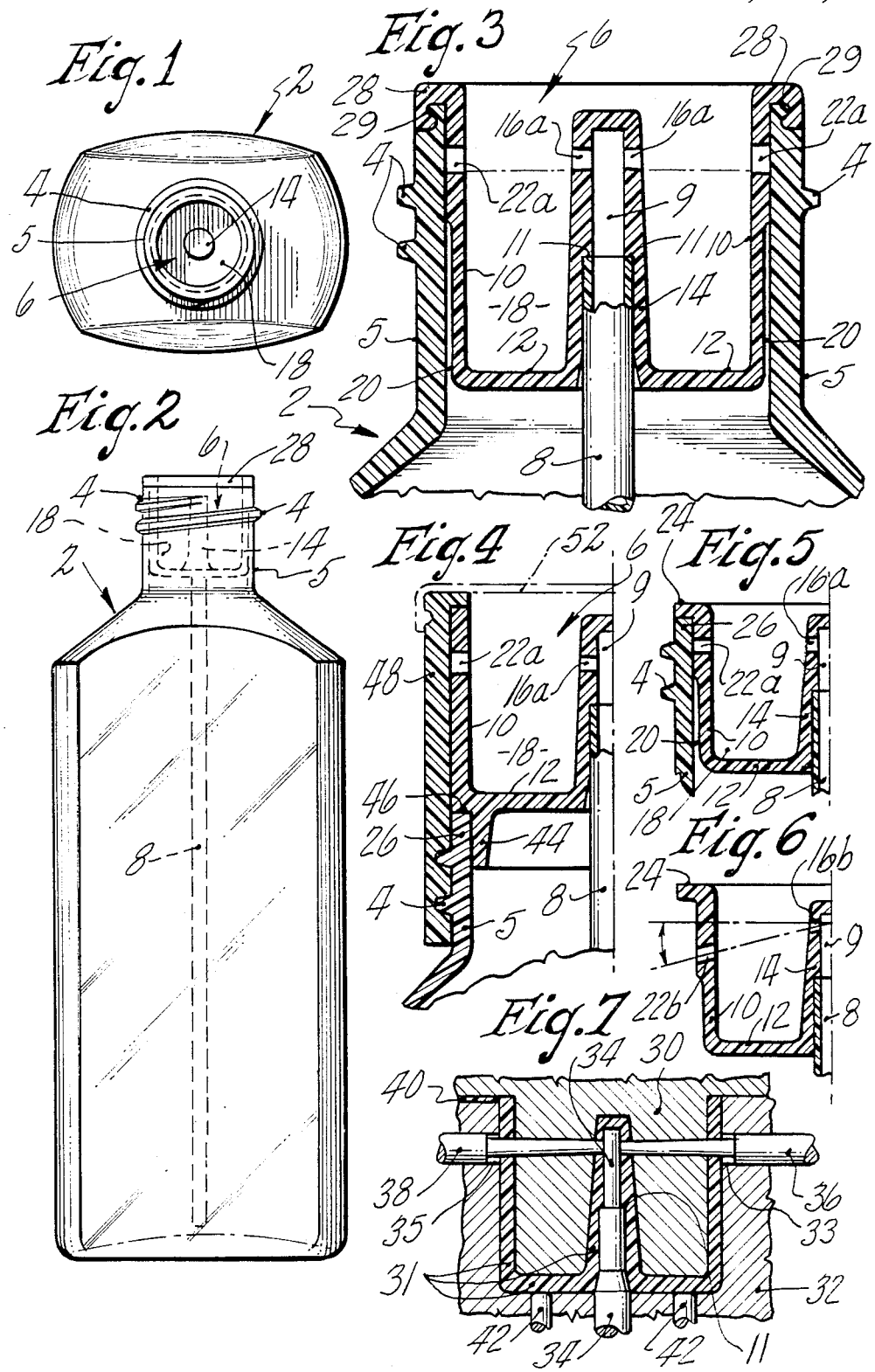

ONE-PIECE MEASURING AND DISPENSING APPARATUS

FIELD OF INVENTION

The present invention is directed to making a one-piece measuring and dispensing apparatus suitable for placement in a neck of a conventional flexible wall container. The apparatus has an upstanding central member with a central bore and an outlet orifice formed therein, side walls, a base wall, and an open top. The outlet orifice has at least one side or lateral discharge port which directs the flow of liquid from the bore at an angle offset from the axis of the bore. The method of making the apparatus involves molding the apparatus utilizing mold halves to form a mold cavity in conjunction with a center core pin and retractable orifice pins.

BACKGROUND OF THE INVENTION

The use of a measuring and dispensing apparatus in the form of a measuring cup or chamber positioned in a neck of a flexible wall container is known in the art. Such apparatus generally contains within its structure a bore and a discharge port in communication with the bore. Liquid is charged through the bore and port into a reservoir area contained in the measuring and dispensing apparatus. The position of the discharge port determines the manner in which the liquid flows into the reservoir. Discharge ports positioned at a side angle to the reservoir area are preferred over ports which discharge liquid straight upward into the reservoir, such as shown in U.S. Pat. No. 3,402,860, since side discharge ports avoid the splashing or wastage of the liquid which results when a liquid squirts upward.

The one-piece prior art devices utilizing a side discharge port, however, required that the bore be formed in the side wall of the measuring chamber and, accordingly, only one discharge port could be used. If a central upstanding member with side discharge ports was utilized, the measuring chamber had to be made in two pieces. Whether a costly manufacturing process is utilized or not to make the multi-part structure, the assembly of the parts is very costly. Injection molding methods presently known in the art do not provide a means of forming discharge ports in the side of a central upstanding member due to the proximity of the side walls of the measuring chamber to the side walls of the central upstanding member. Pins cannot be utilized to form the side discharge ports since no room is present in which to withdraw the pins following a molding operation.

For example, French Patent No. 1,395,827 shows a measuring chamber in FIG. 3 which has a central upstanding member with a single discharge port. The method of making the chamber is not shown. However, it would not be by injection molding as in the present invention due to the structure of the discharge port. The port structure in the side wall allows the liquid dispensed through the bore to squirt straight up since the port is not fully positioned beneath the top surface of the upstanding member.

Donoghue, U.S. Pat. No. 4,077,547, discloses a measuring chamber with a central upstanding member having a plurality of side discharge ports formed therein. However, due to the close proximity of the side walls of the measuring chamber to the central upstanding member, the side ports could not be formed by injection molding if a onepiece measuring chamber was to be produced. Accordingly, the measuring chamber described is composed of two parts.

U.S. Pat. Nos. 2,599,446 and 2,743,849 disclose measuring chamber inserts for sealing a container neck. The inserts, however, require the bore to be in one side of the chamber insert rather than in the center of the insert. Only one discharge port can be used with each of the structures described thereby limiting the amount of liquid discharged at one time.

It is also noted that U.S. Pat. No. 2,599,446 teaches the use of a downward angle with the discharqe port for directing liquid through the port and into the recess of the measuring chamber.

Accordingly, the art does not teach a one-piece injection molded measuring and dispensing apparatus with a central upstanding member having discharge ports formed in the side walls of the upstanding member or a method of making such a one-piece apparatus by injection molding.

OBJECTS OF THE INVENTION

A primary object of the present invention is to provide a method of making by molding a one-piece measuring and dispensing apparatus having side or lateral discharge ports in a central upstanding member for directing a flow of liquid at an angle offset from the axis of the upstanding member.

A further primary object of the present invention is to provide a method of making a one-piece measuring and dispensing apparatus by molding, utilizing retractable orifice pins in conjunction with mold halves and a center core pin.

A further primary object of the present invention is to provide a method of making a one-piece measuring and dispensing apparatus which is economical and simple in operation.

A further primary object is to provide a one-piece injection molded measuring and dispensing apparatus having a central upstanding member containing one or more side discharge ports.

BRIEF DESCRIPTION OF THE DRAWINGS

In the drawing,

FIG. 1 is a top plan view of a flexible wall container having a measuring and dispensing apparatus of the present invention positioned in its neck;

FIG. 2 is a front view of the flexible wall container shown in FIG. 1;

FIG. 3 is an enlarged cross-sectional view of the neck of the container and the measuring and dispensing apparatus positioned therein as illustrated in FIGS. 1 and 2;

FIG. 4 is a fragmentary alternative embodiment of the measuring and dispensing apparatus of the present invention;

FIG. 5 is a fragmentary cross-sectional view illustrating still another alternative embodiment of the measuring and dispensing apparatus of the invention;

FIG. 6 illustrates an alternative embodiment wherein the lateral discharge ports are at a slight angle;

FIG. 7 illustrates the position of the mold pins when molding the measuring and dispensing apparatus according to the present invention;

BRIEF DESCRIPTION OF THE INVENTION

Figure 8:
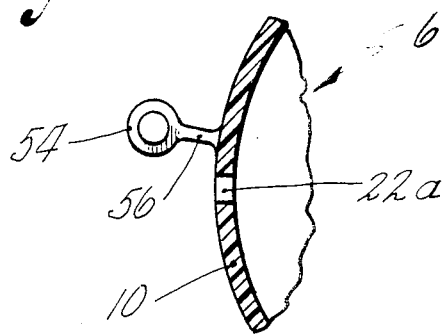
FIGS. 8 and 9 are fragmentary cross-sectional views showing an embodiment utilizing an integral plug structure with the measuring and dispensing apparatus for sealing the pin holes which are formed in the side walls of the metering chamber during the molding operation.

The present invention involves a one-piece measuring and dispensing apparatus in the form of an open top chamber or cup which is suitable for placement in a neck of a flexible wall container and a method of making the apparatus.

The measuring and dispensing apparatus, hereinafter referred to as a measuring chamber, has side walls, a base wall, an open top, and a central upstanding member with a bore formed along its central axis for receiving a tube means. The top portion of the side walls of the upstanding central member have side or lateral discharge ports formed therein to direct the flow of liquid received through the tube means and bore out of the upstanding member at an angle offset from the axis of the upstanding member. The top wall of the upstanding member is solid, i.e. closed, thereby not providing an outlet to the liquid and forcing the liquid to exit through the lateral discharge ports.

To dispense liquid which is held in a container having the measuring chamber of the present invention positioned in its neck, the flexible walls of the container are squeezed forcing the liquid up through the tube means and bore through the side discharge ports into a recess or reservoir area of the measuring chamber. The side location and number of the discharge ports allows for a controlled release of the liquid into the recess of the measuring chamber. The side discharge ports are preferably positioned at a 90° angle or less to the axis of the central upstanding member. When the angle of the discharge ports is less than 90°, the ports are inclined downwardly in the direction of the base wall of the measuring chamber.

The method of making the above-described measuring chamber is preferably by injection molding utilizing an upper and lower mold half to form a mold cavity which substantially defines the shape of the measuring and dispensing apparatus to be formed. A center core pin is raised or inserted through the center of the bottom of the lower mold half to form the bore which is present in the upstanding central member of the measuring chamber. Thereafter, orifice pins, which are utilized to form the lateral discharge ports, are advanced into the mold until they abut the center core pin. After the pins are in position, the mold cavity is filled with a plastic and the plastic allowed to set. The orifice pins are then retracted. When the orifice pins are fully retracted, the mold halves are opened and the molded measuring chamber removed therefrom. The center core pin is pulled down and away from the molded product when the lower mold is moved down during the opening of the molds. The molded product is then ready for use.

As stated, the lateral discharge ports in the central upstanding member are preferably formed at an angle of 90° or less to the axis of the central upstanding member to control the flow of liquid therethrough during the forcing of liquid into the measuring chamber reservoir. The angle of the ports is determined by the angle at which the orifice pins abut the center core pin during the molding operation. The orifice pin should preferably lie flat against the center core pin to produce a solid, unobstructed and smooth passageway between the bore and the measuring chamber recess.

Figure 10:
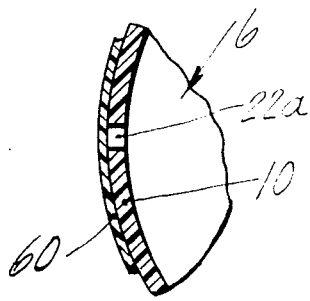
FIG. 10 is a fragmentary cross-sectional view showing a portion of a shrink-wrap for sealing the pin holes.

When the measuring and dispensing apparatus is placed in the neck of a flexible wall container, the side walls of the container neck serve to seal the holes formed in the side walls of the measuring chamber by the orifice pins during the molding operation. Alternatively, a button or plug can be integrally molded with the side walls of the orifice and utilized to seal the holes formed by the orifice pins. A further alternative for sealing the holes formed by the orifice pins, if the measuring chamber is not to be fully inserted in a container neck, is through the use of a shrink band as shown in FIG. 10 or a rigid encircling member as shown in FIG. 4 around the exterior of the measuring chamber side walls.

DESCRIPTION OF THE PRESENTLY PREFERRED EMBODIMENT

Referring to the drawings, wherein like numerals refer to like features, FIGS. 1–3 illustrate a flexible wall container 2 having a threaded finish 4 around the neck 5 of the container. The measuring and dispensing apparatus or chamber 6 is placed or inserted into neck 5 of container 2. Tube means 8 extends from the measuring chamber 6 into the container 2.

As best shown in FIG. 3, measuring chamber 6 is formed having side walls 10, base wall 12, central upstanding member 14 which has a bore 9 along its central axis structured to receive tube means 8, and an open top. Upstanding member 14 preferably has tapered side walls and as depicted in FIG. 3 contains a step area 11 at the interior of its side walls so that tube means 8 cannot extend up the entire length of the bore. Additionally, step area 11 controls the bottom length of the tube which extends into the container.

Formed in the upper portion of upstanding member 14, above the top of tube means 8, is at least one side or lateral discharge port 16a which serves to direct the flow of liquid from tube means 8 and bore 9 out of upstanding member 14 at an angle offset from the axis of upstanding member 14 into the recess or reservoir area 18 of measuring chamber 6. While upstanding member 14 can contain only one lateral discharge port, the preferred number of ports is two. This results in a more efficient discharge and fill rate of recess 18.

The side or lateral discharge ports 16a are preferably formed in upstanding member 14 at a 90° angle to the central axis of member 14 or at a downward incline in the direction of the base wall 12 of the measuring chamber, i.e. at less than a 90° angle to the central axis of member 14, as shown in FIG. 6. This serves to direct the liquid being dispensed in a controlled manner into recess 18 thereby avoiding having the liquid splash or squirt out of the measuring chamber. This insures neat and efficient filling and avoids wastage of the liquid and the spilling of liquid on the user or surrounding area.

FIG. 3 illustrates side or lateral discharge ports 16a positioned at a 90° angle to the central axis of upstanding member 14. FIG. 6 illustrates a measuring chamber having lateral discharge ports 16b formed with a downward slope, i.e less than a 90° angle. It is noted that openings 22a and 22b of FIGS. 3 and 6 respectively will have a corresponding angle and be in alignment with ports 16a and 16b. Openings 22a and 22b are described further below in relation to the method of making the apparatus of the present invention.

Preferably, as best shown in FIGS. 3, 5, and 6, side walls 10 are tapered so that the lower portion of the measuring chamber is narrower in width than the upper portion. Such a side wall structure allows for clearance 20 between the side walls of the measuring chamber and the side walls of the container neck thereby making it easier to place the measuring chamber by insertion or pushing into a container neck. The upper portion of the measuring chamber, due to its enlarged width as compared with the width of the lower portion of the measuring chamber, results in a tight seal by friction fit between it and the neck wall of the container. This friction fit locks the measuring chamber in the neck and forms a seal between the neck and the measuring chamber thereby preventing leakage of liquid from the container or removal of the measuring chamber by simply inverting the container. Such a friction fit also serves to seal openings 22a and 22b as further described below.

To further secure the measuring chamber in place within the neck of a flexible wall container and to further insure a tight liquid seal, the top of side walls 10 can be structured to sealingly attach to the top of container neck 5. In one embodiment, as illustrated in FIG. 5, the top of side walls 10 are formed to include an outwardly projecting ledge 24 which engages the top 26 of the container neck. The projecting ledge can also be formed to include a downturned portion 28, as shown in FIG. 3, which serves to lock the measuring chamber on the neck 5 of the container 2. When the locking structure of the alternative embodiment as shown in FIG. 3 is utilized, the top 29 of the container neck will have a shape complementary to locking portion 28.

The presently preferred method of making the measuring chamber described above having lateral discharge ports 16a or 16b formed in upstanding member 14 is by injection molding utilizing a pair of mold halves, to provide a molding cavity, in conjunction with pins.

The measuring chamber is preferably made from a plastic material such as polyethylene, polyvinyl chloride, polypropylene or polyethylene terephthalate. The plastic is preferably translucent or transparent to allow the user of a container having the measuring chamber placed therein to see through the side walls and thereby see the amount of liquid being measured into the measuring chamber. The plastic, however, can also be opaque and the user look into the measuring chamber through the top opening of the measuring chamber in order to view the amount of liquid being measured.

The measuring chamber as described above is made utilizing conventional molding apparatus and techniques. One method is shown in FIG. 7. The mold comprises upper mold half 30 and lower mold half 32. The upper and lower mold halves when closed form a mold cavity 31 which substantially defines the shape of measuring chamber 6. During the closing of the upper and lower mold halves, center core pin 34 is raised into the mold cavity to form the area resulting in bore 9 of upstanding member 14. Center core pin 34 will be shaped accordingly to form a bore with a step 11 which positions tube means 8.

Thereafter, orifice pins 36 and 38 are advanced through openings 33 and 35 in the sides of the upper and lower mold halves 30 and 32 until the orifice pins abut the center core pin 34. The timing of the machine cycle of the molding apparatus is utilized to advance the orifice pins into place. As illustrated in FIG. 7, two lateral discharge ports are formed. The number of orifice pins utilized can be varied, however, to correspond to the number of lateral discharge ports desired. Further, the ports formed as illustrated in FIG. 7, due to the angle of the abutment of the orifice pins to the core pin, will be formed at a 90° angle to the central bore 9 of upstanding member 14 as shown in FIG. 3, or at a downwardly inclined angle, i.e. having an angle of less than 90°, as shown in FIG. 6. In the latter case, the ends of orifice pins 36 and 38 which abut central core pin 34 are preferably slanted to insure a flat abutment of the orifice pins to the core pin so as to provide the formation of a solid, unobstructed and smooth passageway from bore 9 through discharge ports 16b to further insure an efficient flow of liquid through upstanding member 14. It is understood that when the orifice pins are positioned at an angle to the center core pin, that passages 33 and 35 will be formed to slope accordingly in mold halves 30 and 32.

Following placement of the core pin and orifice pins, plastic is injected by a conventional means through passage 40 into the mold cavity 31. After the cavity has been filled and the plastic has been allowed to set, the machine cycle operates to retract orifice pins 36 and 38. When the orifice pins are fully retracted, sensors present in the molding apparatus will signal or serve to activate a switch so that upper and lower mold halves 30 and 32 open automatically. Thereafter, a stripper plate as known in the art (not shown) and/or knock out pins 42 are utilized to remove the finished molded measuring chamber from mold halves 30 and 32. The center core pin does not have to be retracted in the manner of the orifice pins since when the lower mold half is moved downward to open the mold halves, the center core pin is also pulled down and thereby away from the molded product.

The orifice pins used in the above-described molding process to form the lateral discharge ports 16a and 16b of measuring chamber 6 are of a standard taper reamer size, such as a ⅜° taper, or a straight wall pin can be used. Passages 33 and 35, through which the orifice pins move, have a diameter suitable for receiving the orifice pins in a sliding relationship.

Due to the manner of placement of the orifice pins in forming lateral discharge ports 16a and 16b, openings 22a and 22b are formed in the side walls 10 of measuring chamber 6. As described above, openings 22a and 22b are sealed when the measuring chamber is inserted into the neck 5 of a container by the friction fit between the upper portion of side walls 10 of the measuring chamber and the side walls of the container neck.

In the alternative embodiment illustrated in FIG. 4, the base 12 of the measuring chamber has a downward projection 44 formed as a part thereof. Projection 44 is spaced inward from side wall 10 to form a ledge 46. This structure allows measuring chamber 6 to sit on the top 26 of the container neck 5. Downward projection 44 extends inside container neck 5 to guide the measuring chamber into position on neck 5 and to maintain the measuring chamber in place against the neck. Projection 44 provides a friction fit between the measuring chamber 6 and the container neck 5. A rigid encircling member or collar 48 as shown in FIG. 4, or alternatively, a shrink band 60 as conventionally known in the art and shown in FIG. 10, is then positioned or formed around measuring chamber 6 and container neck 5. The collar or band thereby acts as an extension of the container neck and seals openings 22a or 22b. A light weight flexible cover 52 can be utilized to close the open top of the measuring chamber. In the embodiment shown in FIGS. 1-3 and 5-6, a conventional container cap which seals the mouth of the container neck utilizing threads 4 serves to also close the top of measuring chamber 6.

Figure 9:
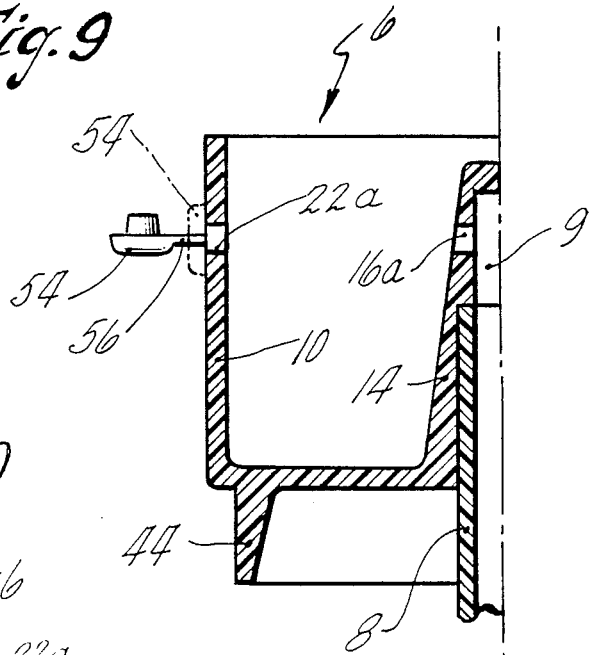

The alternative embodiment for sealing openings 22a or 22b of measuring chamber 6 illustrated in FIGS. 8 and 9 utilizes an integrally molded sealing plug or button 54. Plug 54 is attached to the side wall 10 of measuring chamber 6 by flexible hinge 56. In use, plug 54 is twisted about hinge 56 and inserted into an opening 22a to seal opening 22a by friction fit. Due to the slight projection of plug 54 along side wall 10 of measuring chamber 6, this alternative embodiment is preferably utilized with a measuring chamber structure such as described in reference to FIG. 4, i.e. where the side wall of the measuring chamber, or at least the portion containing the plug therein, is positioned above the top of the container neck.

In operation (which is identical in all embodiments of the invention), the measuring chamber 6 is placed in the neck of a flexible wall container 2. Tube means 8, which is connected to the measuring chamber, is of a length sufficient to reach from its upper end positioned in bore 9 of upstanding member 14 to a point proximate the base of container 2. The user squeezes the flexible walls of the container to displace a liquid therefrom through tube means 8 and bore 9 in upstanding member 14 and out lateral discharge ports 16a or 16b into recess area 18 of the measuring chamber. When the user releases the pressure being applied to the flexible walls of container 2, the liquid flow will cease. Thus, the user is able to accurately dispense the desired amount of liquid from the container into the measuring chamber. It will be understood by those skilled in the art that if the volume of liquid dispensed from container 2 into recess 18 of measuring chamber 6 is in excess of the volume in the measuring chamber, that the excess liquid will be sucked back into container 2 through lateral discharge ports 16a or 16b when the pressure is released from the flexible walls of the container. Accordingly, the positioning and angle of the lateral discharge ports 16a or 16b in conjunction with the width and length of the measuring chamber, determine the maximum amount of liquid held in the measuring chamber before it is dispensed. The liquid is then dispensed from the measuring chamber by tilting or inverting container 2 to pour the liquid out through the open top of the measuring chamber.

As will be apparent to one skilled in the art, various modifications can be made within the scope of the aforesaid description. Such modifications being within the ability of one skilled in the art form a part of the present invention and are embraced by the appended claims.

It is claimed:

1. A one-piece injection molded measuring an dispensing apparatus for placement in the neck of a flexible wall container comprising (a) side walls with at least one opening formed therein;
    (b) a base wall attached to one end of said side walls;
    (c) a central upstanding member attached to and extending upward through the center of said base wall into an area within said side walls, said central upstanding member containing a bore along its central axis and at least one discharge port in its side walls which is in alignment with said at least one opening contained in said side walls of said apparatus, said bore being in communication with said at least one discharge port and an area outside said base wall; and
    (d) an open top.

2. The one-piece injection molded measuring and dispensing apparatus according to claim 1 wherein said at least one discharge port is at a 90° angle to said bore.

3. The one-piece injection molded measuring and dispensing apparatus according to claim 1 wherein said at least one discharge port is inclined toward said base wall of said apparatus.

4. The one-piece injection molded measuring and dispensing apparatus of claim 1 wherein said at least one opening in said apparatus side walls is sealed by one of a friction fit between said container neck or an extension of said container neck and said apparatus side walls.

5. The one-piece injection molded measuring and dispensing apparatus according to claim 1 wherein said at least one opening in said apparatus side walls is sealed by integrally molded plugs.

6. The one-piece injection molded measuring and dispensing apparatus according to claim 1 wherein said at least one opening in said apparatus side walls is sealed by a rigid member encircling said apparatus side walls.

7. The one-piece injection molded measuring and dispensing apparatus according to claim 1 wherein said at least one opening in said apparatus side walls is sealed by a shrink band.

* * * * *